United States Patent [19]

Croup

[11] 4,019,708
[45] Apr. 26, 1977

[54] LATCHABLE SWIVEL MOUNT FOR LOUDSPEAKER

[75] Inventor: Robert E. Croup, Indianapolis, Ind.

[73] Assignee: Acoustic Fiber Sound Systems, Inc., Indianapolis, Ind.

[22] Filed: Oct. 29, 1975

[21] Appl. No.: 626,745

[52] U.S. Cl. .............................. 248/137; 403/97; 248/140

[51] Int. Cl.² ..................................... A47F 5/12

[58] Field of Search ......... 248/133, 137, 139, 140, 248/141, 142, 145; 179/1 E; 403/97

[56] References Cited

UNITED STATES PATENTS

| | | | |
|---|---|---|---|
| 920,713 | 5/1909 | Auster | 403/97 |
| 1,293,699 | 2/1919 | Cannon | 248/137 |
| 1,467,719 | 9/1923 | Falls | 248/140 |
| 2,904,298 | 9/1959 | Tateishi | 248/137 |
| 3,112,547 | 12/1963 | Poe | 85/5 R |
| 3,317,225 | 5/1967 | Cooper | 403/97 |
| 3,330,594 | 7/1967 | Cadle | 403/97 |
| 3,420,485 | 1/1969 | Price | 248/137 |

*Primary Examiner*—Robert A. Hafer
*Attorney, Agent, or Firm*—Prangley, Dithmar, Vogel, Sandler & Stotland

[57] ABSTRACT

A swivel mount includes a support bracket including a pair of parallel swivel arms spaced apart to accommodate a loudspeaker assembly therebetween, and having coaxial openings therethrough respectively carrying therein two plunger-actuated expansion type fasteners, the expansible portions of which extend inwardly from the swivel arms. Two swivel members are respectively fixedly secured to opposite sides of the loudspeaker assembly, each having a hollow cylindrical portion receiving therein the expansible portion of the adjacent fastener for support thereon and for rotational and axial movement with respect thereto. Each swivel member carries detent teeth and is axially movable for meshing engagement thereof with complementary detent teeth on the adjacent swivel arm for preventing relative rotational movement of the swivel member and swivel arm. Each swivel member is so dimensioned that only when the detent teeth are thus engaged, the fastener may be expanded into engagement with the inside of the swivel member for preventing axial and rotational movement thereof, thereby locking the detent teeth in their engaged position.

21 Claims, 9 Drawing Figures

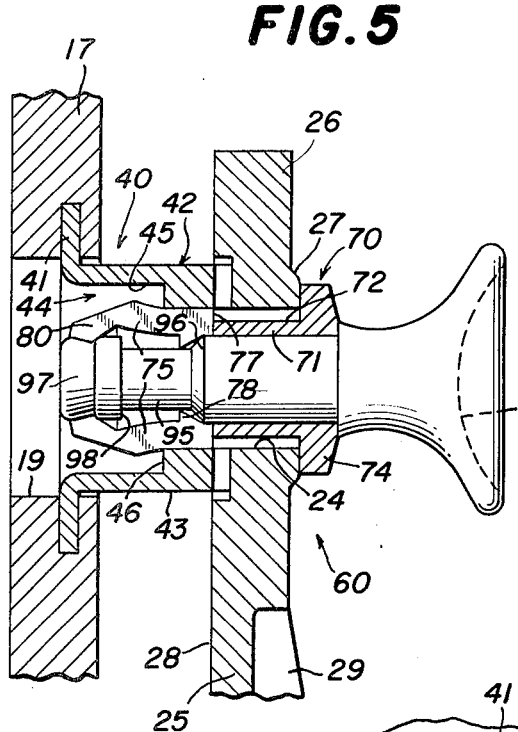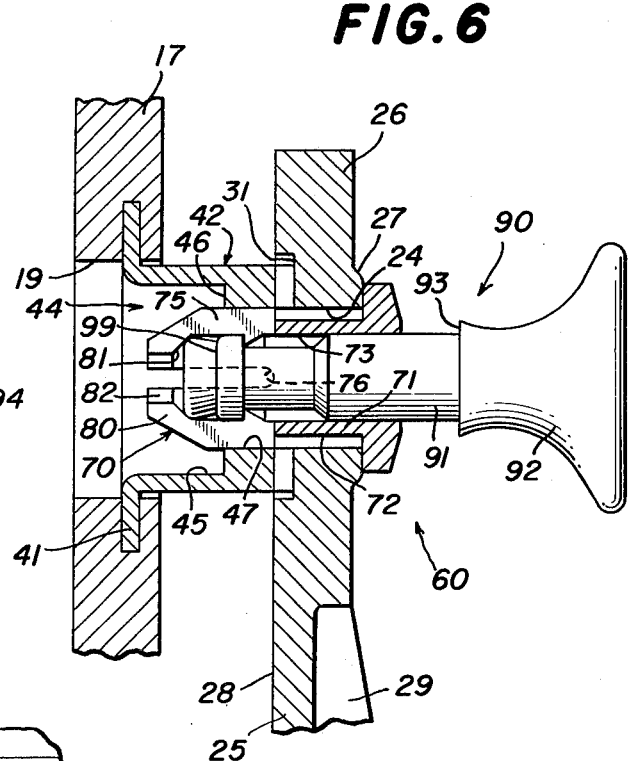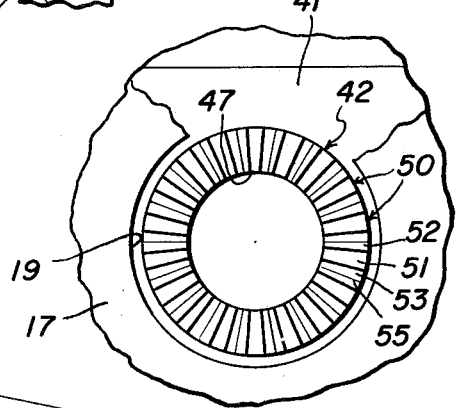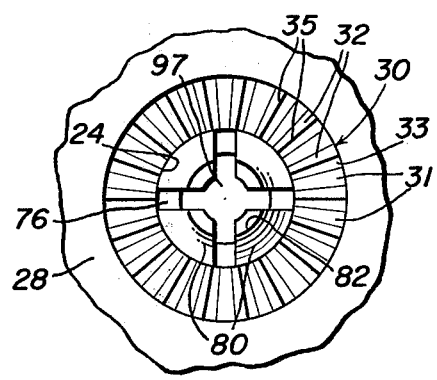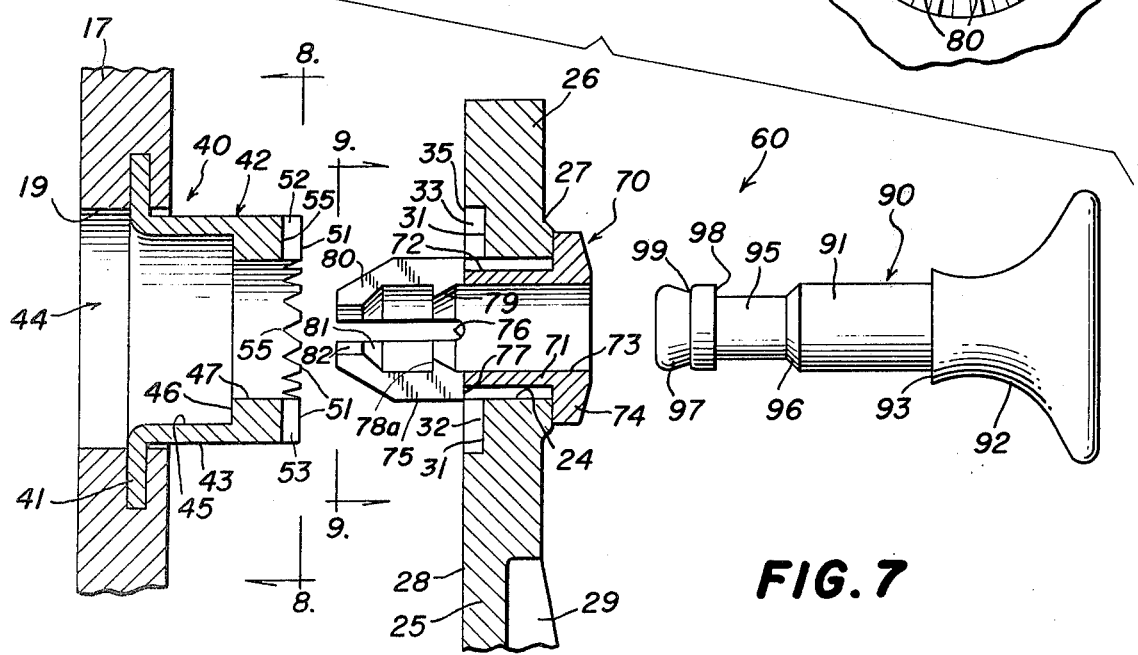

LATCHABLE SWIVEL MOUNT FOR LOUDSPEAKER

BACKGROUND OF THE INVENTION

The present invention relates to swivel mounting means and in particular to a swivel mount for a loudspeaker assembly of the type mounted in vehicles such as automobiles, trucks and the like for use with citizens' band radio systems. It is often desired to utilize with such citizens' band radio systems, loudspeaker assemblies which are separate from the transceiver equipment and which can be more conveniently positioned than can speakers which are built into the radio console unit. At present, such separate loudspeakers must be rigidly and permanently mounted. While swivel type mounts which could be used for mounting such loudspeaker assemblies are known in the prior art, these mounting arrangements are somewhat cumbersome and necessitate the adjustment and manipulation of screws or wing nuts or the like in order to change the orientation of the mounted object. Other types of swivel mounts utilize a frictional interference between the mount and the mounted object, and while such mounts afford simple and easy variation of the position of the mounted object, they are unsuitable for mounting a loudspeaker assembly in an automobile because the frictional holding force is not sufficient to hold the loudspeaker in position against the vibration and jarring encountered in a moving vehicle.

Plunger-actuated expansion type fasteners are known in the art which provide simple push-pull latching and unlatching operation, as disclosed, for example, in U.S. Pat. No. 3,112,547, issued to L. R. Poe on Dec. 3, 1963. However, such fasteners have not been adapted for use in latching parts against relative rotational movement.

SUMMARY OF THE INVENTION

The present invention provides a novel swivel mount adapted for use in mounting loudspeaker assemblies in vehicles, but also usable for swivel mounting any other suitable object, the mount being simple and economical in constuction, and including easily operable latching mechanism movable between a latching configuration positively locking the mounted object against rotation and a release configuration accommodating free rotation of the mounted object for adjustment of the position thereof.

This is accomplished in the present invention, and it is an object of the present invention to accomplish this result by providing a first swivel member having mounted thereon a plunger-actuated expansion type fastener, the expansible portion of which is received in an aperture in a second swivel member for support thereof for rotational and axial movement with respect to the first swivel member, the first and second swivel members being respectively provided with complementary detent means and being axially movable to a position for engagement of the detent means to prevent rotation of the first and second swivel members with respect to each other, the fastener being expansible into engagement with the second swivel member when the detent means are thus engaged to lock the assembly against further movement until the fastener is moved back to its unexpanded condition.

More particularly, it is an important object of the present invention to provide a latchable swivel mount comprising first and second swivel members coupled for relative rotational movement about a predetermined common axis and for relative axial movement along the axis, first detent means carried by the first swivel member, second detent means carried by the second swivel member and adapted for engagement with the first detent means to prevent relative rotational movement of the first and second swivel members, the first and second swivel members being movable axially between a swivel configuration wherein the first and second detent means are disengaged to permit relative rotational movement of the first and second swivel members and a latching configuration wherein the first and second detent means are engaged to prevent relative rotational movement of the first and second swivel members, and latch mechanism operable between a latching condition for locking the first and second swivel members in the latching configuration thereof and a release condition permitting relative axial movement of the first and second swivel members between the swivel and latching configurations thereof.

In connection with the foregoing object, it is another object of this invention to provide a latchable swivel mount of the character described, which further includes a shaft carried by the first swivel member and extending therefrom coaxially with the axis, the second swivel member being supported by the shaft.

In connection with the foregoing objects, another object of this invention is to provide a latchable swivel mount of the character described, wherein the shaft has an expansible portion having an expander aperture extending axially therethrough and movable between a normal unexpanded condition and an expanded condition, the expansible portion having shoulder means extending inwardly of the expander aperture toward the axis for constricting the expander aperture, the second swivel member having a receiving aperture therein and receiving coaxially thereinto the expansible portion of the shaft in the unexpanded condition thereof, the latch mechanism including an expander member slidably supported in the expander aperture of the shaft for movement axially thereof between the latching position engaging the shoulder means and forcing the expansible portion outwardly to the expanded condition thereof to interfere with the second swivel member effectively to prevent axial movement thereof thereby to lock the first and second swivel members in the latching configuration thereof and a release position allowing the expansible portion of the shaft to be in a normal unexpanded condition thereof for permitting relative axial movement of the first and second swivel members.

In connection with the foregoing object, it is another object of this invention to provide a latchable swivel mount of the character described, the second swivel member having an abutment extending into the receiving aperture and effecting partition thereof into first and second regions of different dimensions and cooperating with the expansible portion of the shaft to permit expansion thereof to the expanded condition thereof only when said first and second swivel members are in the latching configuration thereof.

Yet another object of this invention is to provide a latchable swivel mount of the character described which includes two sets of first and second swivel members, the first swivel members comprising parallel spaced-apart arms of a support member adapted to be mounted on an associated support surface, and the second support members being respectively adapted to be fixedly secured to opposite sides of an object to be supported between the two arms.

Further features of the invention pertain to the particular arrangement of the parts of the latchable swivel mount whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 5 is an enlarged fragmentary view in vertical section taken along the line 5—5 in FIG. 2, and illustrating the detailed construction of the latching mechanism of the present invention, with the parts shown latched against rotation;

FIG. 6 is a view similar to FIG. 5, with the parts illustrated in the unlatched condition for free rotational and axial movement;

FIG. 7 is an exploded view of the parts of the latching mechanism illustrated in FIGS. 5 and 6;

FIG. 8 is a fragmentary side elevational view of the loudspeaker swivel member of the present invention, taken along the line 8—8 in FIG. 7, with portions of the loudspeaker broken away more clearly to show the construction of the swivel member; and FIG. 9 is a fragmentary side elevational view of the swivel arm and associated expansion fastener of the present invention, taken along the line 9—9 in FIG. 7.

DESCRIPTION OF THE PREFERRED EMBODIMENT

Figure 1:
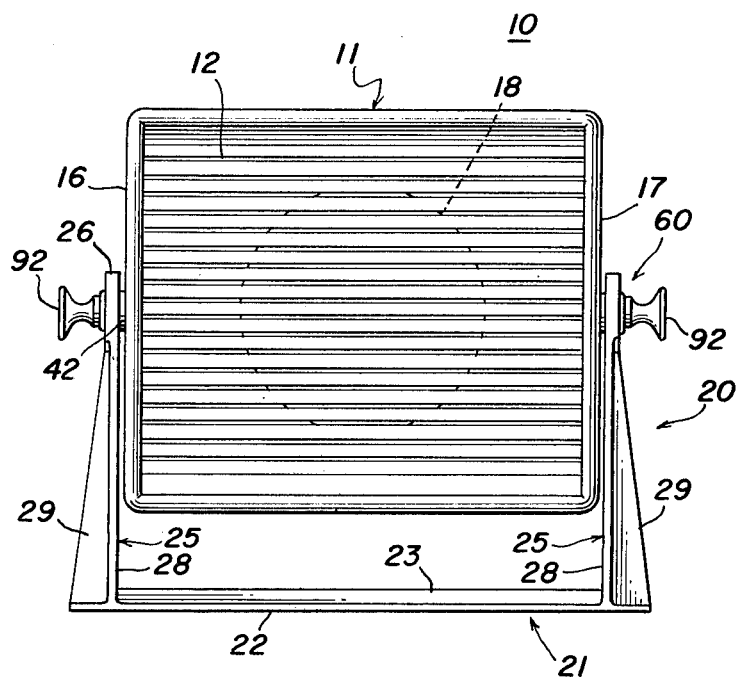
FIG. 1 is a front elevational view of the swivel mount constructed in accordance with and embodying the features of the present invention, shown supporting a loudspeaker assembly thereon.
Figure 2:
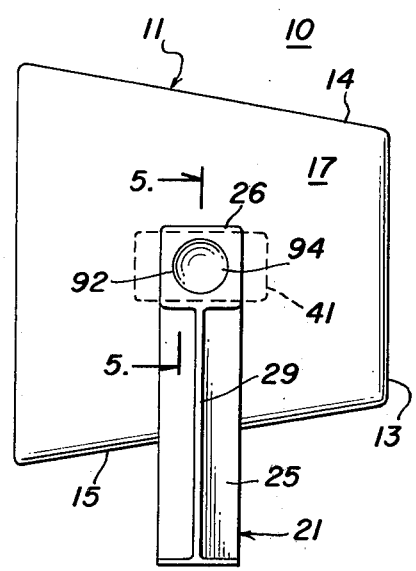
FIG. 2 is a side elevational view of the swivel mount illustrated in FIG. 1.
Figure 3:
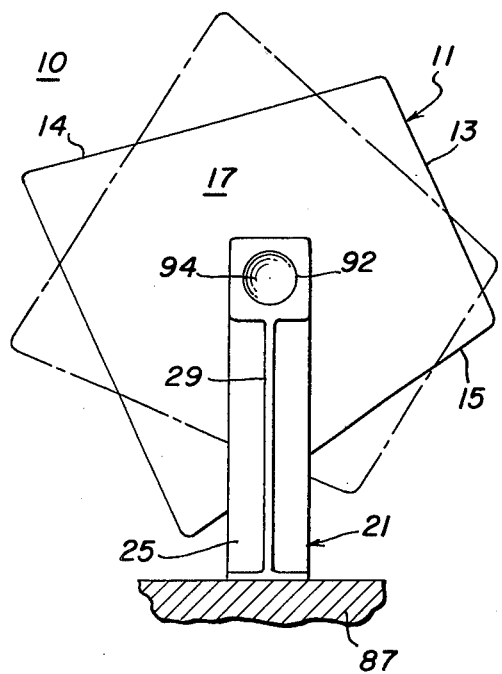
FIG. 3 is a view similar to FIG. 2, showing the swivel mount mounted upon a horizontal support surface, and illustrating the supported loudspeaker assembly in two different orientations with respect to the swivel mount.
Figure 4:
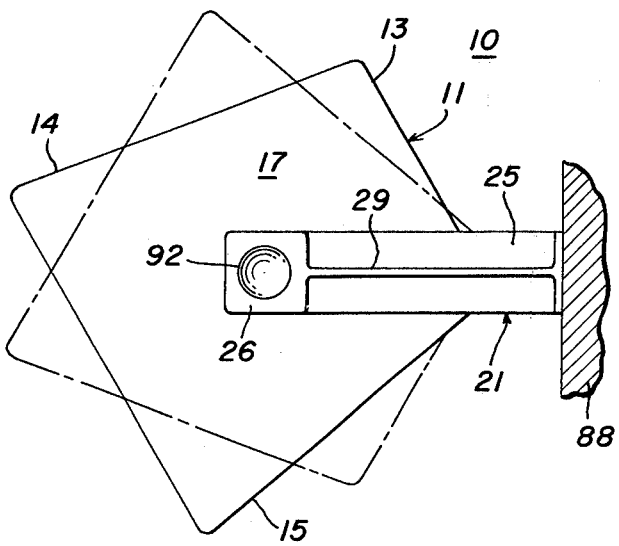
FIG. 4 is a view similar to FIG. 3, but showing the swivel mount mounted on a vertical support surface.

Referring now to FIGS. 1 through 4 of the drawings, there is illustrated a loudspeaker assembly, generally designated by the numeral 10, mounted on a swivel mount, generally designated by the numeral 20, which is constructed in accordance with and embodies the features of the present invention. The loudspeaker assembly 10 includes an enclosure or housing, generally designated by the numeral 11, which is box-like in configuration and includes a rectangular front grill 12, a rectangular rear wall 13, opposed trapezoidal top and bottom walls 14 and 15, and opposed trapezoidal side walls 16 and 17. Supported within the enclosure 11 is a loudspeaker 18. The enclosure 11 may be of the type disclosed in applicant's copending Application Ser. No. 500,597, filed Aug. 26, 1974, entitled "Loudspeaker Assembly", and now U.S. Pat. No. 3,941,207, issued Mar. 2, 1976, assigned to the assignee of the present invention. Preferably, apertures 19 (see FIGS. 5-7) are provided in the opposite side walls 16 and 17 of the enclosure 11 for a purpose to be described below.

The loudspeaker assembly 10 is mounted for pivotal movement on a swivel mount 20 which includes a generally U-shaped mounting bracket 21 having an elongated base 22 provided with a rib 23 extending the length thereof and preferably having a plurality of apertures (not shown) therethrough for receiving associated fastening means such as screws or the like. Integral with the base 22 at the opposite ends thereof and extending therefrom substantially normal thereto are two swivel arms 25 disposed in parallel relationship. Each of the arms 25 is a thin flat rectangular member having a substantially square thickened portion 26 at the distal end thereof having a circular opening 24 extending therethrough and having a circular built-up abutment portion 27 on the outer surface thereof in surrounding relationship with the adjacent end of the opening 24 (see FIGS. 5-7). Each of the swivel arms 25 has a flat planar inner surface 28, the inner surfaces 28 of the two swivel arms 25 being disposed in facing parallel relationship with each other. Preferably, each of the swivel arms 25 is also provided on the outer surface thereof with a stiffening web 29 extending longitudinally thereof for providing added rigidity.

The two swivel arms 25 are identical in construction, being disposed in mirror image relationship, and two identically constructed latching assemblies, to be described below, are respectively associated with the swivel arms 25. Therefore, only one of these latching assemblies will be described in detail. Referring now also to FIGS. 5 through 9 of the drawings, there is formed in the inner surface 28 of each swivel arm 25 a recessed flat circular array of detent teeth, generally designated by the numeral 30, disposed circumferentially about the periphery of the inner end of the opening 24. As best illustrated in FIG. 9, each of the teeth 30 is in the shape of an elongated tetrahedron extending radially outwardly from the perimeter of the inner end of the opening 24, the teeth 30 being separated by generally wedge-shaped recessed areas 31 in the inner surface 28 of the swivel arm 25. Each of the teeth 30 has a radially extending crest 35 with flanks 32 and 33 extending downwardly therefrom to the base of the recessed areas 31, the crests 35 of the teeth 30 being substantially coplanar with the inner surface 28 of the swivel arm 25.

Two identically constructed swivel members, generally designated by the numeral 40, are respectively carried by the side walls 16 and 17 of the enclosure 11. More particularly, each of the swivel members 40 includes a flat rectangular base 41, and a cylindrical turrent or sleeve 42 integral with the base centrally thereof and extending therefrom, the sleeve 42 being circular in transverse cross section and having a longitudinal axis disposed substantially normal to the base 41. Extending axially through the sleeve 42 and the base 41 is a bore or aperture 44 of varying circular cross section. The bore 44 is defined by a relatively large diameter cylindrical inner surface 45 adjacent to the base end of the sleeve 42 and a relatively small diameter cylindrical inner surface 47 adjacent to the distal end of the sleeve 42, the surfaces 45 and 47 being interconnected by an annular abutment surface or shoulder 46 disposed substantially parallel to the base 41, thereby to form large diameter and small diameter regions of the bore 44. The cylindrical inner surface 47 has an inner diameter substantially equal to that of the opening 24 in the swivel arm 25. The outer cylindrical surface of the sleeve 42 has a diameter slightly less than the inner diameter of the cylindrical aperture 19 in the adjacent side wall (16 or 17) of the enclosure 11, the base end of the sleeve 42 being received within the aperture 19 and the base 41 being embedded in the adjacent side wall (16 or 17) of the enclosure 11 or otherwise fixedly secured thereto so that the swivel member 40 is immovable with respect to the enclosure 11.

Recessed in the distal end of the sleeve 42 is a flat circular array of detent teeth, generally designated by the numeral 50, disposed circumferentially about the outer end of the bore 44 and being complementary to the array of teeth 30 on the adjacent swivel arm 25. More particularly, each of the teeth 50 extends radially outwardly from the cylindrical inner surface 47 to the outer cylindrical surface of the sleeve 42, each tooth 50 having a generally wedge-shaped flat planar crest 51 and a pair of inwardly sloping flanks 52 and 53 at the opposite edges thereof, the flank 52 of one tooth intersecting the flank 53 of the adjacent tooth at a radially extending root line 55 to define a generally V-shaped recess between adjacent teeth. The crests 51 of the teeth 50 are substantially coplanar, and the teeth 50 are dimensioned and arranged for meshing engagement with the teeth 30, with the teeth crests 55 being received in the recesses 31 and with the teeth crests 35 being received in the roots 55.

Carried by each of the swivel arms 25 is a latch assembly, generally designated by the numeral 60, the latch assemblies 60 being identical in construction, whereby only one of these assemblies will be described in detail. Preferably, the latch assembly 60 is a plunger-actuated expansion type fastener of the type disclosed in U.S. Pat. No. 3,112,547, issued to L. R. Poe on Dec. 3, 1963, the disclosure of which patent is incorporated hereby by reference. Basically, the latch assembly 60 comprises an expansible fastener, generally designated by the numeral 70, and an expander plunger, generally designated by the numeral 90, the plunger 90 being adapted for slidable movement axially through the fastener 70 to effect operation thereof between unexpanded and expanded conditions.

The expansible fastener 70 includes a cylindrical body or shaft 71 substantially circular in transverse cross section and having a cylindrical outer surface 72 and a cylindrical inner surface 73, the latter defining an expander bore or aperture extending axially through the fastener 70. The diameter of the outer cylindrical surface 72 is less than the inner diameter of the opening 24 through the swivel arm 25 and is provided at one end thereof with a radially outwardly extending annular abutment flange 74 having an outer diameter substantially greater than the diameter of the opening 24. Integral with the other end of the body or shaft 71 is a plurality of expansible fingers 75, preferably four in number, separated by elongated slots 76. The portions of the fingers 75 adjacent to the body or shaft 71 form sectors of a circular cylindrical outer surface which has an outer diameter substantially equal to the inner diameter of the opening 24 through the swivel arm 25, and which is connected to the outer surface 72 of the shaft 71 by an annular shoulder or abutment surface 77.

Projecting radially inwardly from the ends of each of the expansible fingers 75 adjacent to the body 71 is an arcuate abutment shoulder 78, the shoulders 78 forming sectors of an annular ring which constricts the aperture through the fastener 70 defined by the cylindrical inner surface 73. Each shoulder 78 has an annular flat planar surface 78a extending radially inwardly at the end of the shoulder 78 toward the distal ends of the fingers 75, and an inclined surface 79 extending from the inner extremity of the surface 78 back toward the outer end of the fastener 70 (see FIG. 9). Each of the expansible fingers 75 is provided at the distal end thereof with an inturned portion 80 extending inwardly toward the longitudinal axis of the fastener 70 and having a sloping inner surface 81 which is inclined toward the axis of the fastener 70 and toward the adjacent distal end of the expansible fingers 75 to intersect a reduced diameter part-cylindrical surface 82, the surfaces 82 of the expansible fingers 75 forming arcs or sectors of a cylindrical surface having a diameter substantially less than the diameter of the cylindrical inner surface 73.

The latch assembly 60 also includes the plunger 90 which is a solid cylindrical member having a main shaft 91 provided at one end thereof with a generally conical handle member 92, and an annular abutment surface or shoulder 93 extending therebetween, the diameter of the shaft 91 being slightly less than the diameter of the cylindrical inner surface 73 of the fastener 70, and the outer diameter of the annular surface 93 being greater than the diameter of the cylindrical inner surface 73. Connected to the shaft 91 at the other end thereof by a frustoconical surface 96 is a reduced diameter cylindrical portion 95 having an outer diameter less than the inner diameter of the annular shoulder 78 on the fastener 70. Integral with the reduced diameter portion 95 at the distal end thereof is an enlarged head 97 having an outer diameter substantially the same as the outer diameter of the shaft 91 and connected to the reduced diameter portion 95 by an annular abutment surface 98. Preferably, the head 97 is provided intermediate the ends thereof with an annular groove or depression 99 extending circumferentially therearound.

In use, the parts are assembled in the configuration illustrated in FIG. 6. In thus assembling the parts, the inturned ends 80 of the expansible fingers 75 of the fastener 70 are inserted through the hole 24 in the swivel arm 25 from the outer end to the inner end thereof. Since the outer diameter of the unexpanded expansible fingers 75 is substantially equal to the diameter of the opening 24, the fastener 70 will be force fitted through the opening 24, the expansible fingers 75 being sufficiently flexible to permit the part to be forced through the hole to the position illustrated in FIG. 6, with the annular shoulder 77 being disposed on the inside of the swivel arm 25, at which point the compressive force on the expansible fingers 75 is released permitting them to return to their normal configuration, wherein the shoulder 77 prevents the fastener 70 from being pulled back through the opening 24. The distance between the shoulder 77 and the flange 74 is only very slightly greater than the length of the opening 24 so that the shoulder 77 and flange 74 cooperate to trap the fastener 70 in the opening 24 and prevent axial movement of the fastener 70 with respect to the swivel arm 25.

The plunger 90 is then inserted coaxially into the aperture in the fastener 70 from the outer end thereof, the head 97 bearing against the sloping surfaces 79 on the shoulders 78 and expanding the expansible fingers 75 outwardly to permit passage of the head 97 past the shoulders 78, the shoulder 98 on the head 97 then cooperating with the annular surfaces 78a on the shoulders 78 to prevent retrograde axial movement of the plunger 90 back through the aperture 73. The expansible fingers 75 of the fastener 70 are then received coaxially within the small diameter region of the bore 44 through the swivel member 40 for supporting the swivel member 40 and the associated loudspeaker assembly 10, it being understood that this same supporting arrangement exists on both sides of the loudspeaker assembly 10.

In the configuration illustrated in FIG. 6, the expansible fastener 70 is rotatably movable with respect to both the swivel arm 25 and the swivel member 40, and the expansible fastener 70 and the swivel member 40 are axially movable with respect to each other, it being understood that there is sufficient flexibility in the swivel arm 25 to permit the entire swivel arm 25 and the fastener 70 carried thereby to be moved generally axially in and out with respect to the swivel member 40.

In operation, the mounting bracket 21 is mounted on any suitable support surface by means of screws or bolts or other suitable fastening means such as adhesives or the like. The mounting bracket 21 may be mounted on any desired support surface, mountings on horizontal and vertical support surfaces 87 and 88 being respectively shown in FIGS. 3 and 4. When thus mounted, the loudspeaker assembly 10 may be swiveled to any desired position, as suggested by the solid line and broken line positions illustrated in FIGS. 3 and 4.

When the loudspeaker assembly 10 has been pivoted or swiveled to its desired position, it may be locked in that position by operation of either or both of the latch asemblies 60 in a manner which will now be described. The swivel arm 25 is pushed inwardly toward the swivel member 40 until the teeth 50 thereon are in meshing engagement with the teeth 30 on the swivel arm 25 as indicated in FIG. 5, a very slight axial movement of the swivel arm 25 and the swivel member 40 with respect to each other being sufficient to accomplish this engagement. When the teeth 30 and 50 are thus engaged, they operate to latch the swivel arm 25 and swivel member 40 against rotational movement with respect to each other, thereby preventing pivotal movement of the loudspeaker assembly 10 with respect to the mounting bracket 21. In order to lock the parts in this latching configuration, the plunger 90 is pushed inwardly to the position illustrated in FIG. 5, which movement may be accomplished with one hand as a continuation of the movement of the swivel arm 25 which engaged the teeth 30 and 50. As the head 97 of the plunger 90 moves axially inwardly it engages the surfaces 81 on the expansible fingers 75, thereby forcing the latter to expand outwardly to an expanded condition illustrated in FIG. 5, wherein they have an outer diameter greater than the diameter of the small diameter region of the bore 44, so that the expansible fingers 75 cooperate with the annular shoulder 46 to prevent retrograde axial movement of the expansible fastener 70 with respect to the swivel member 40. The axial inward movement of the plunger 90 is continued until the inturned ends 80 of the expansible fingers 75 fall into the groove 99 on the plunger head 97, thus serving to hold the plunger 90 in place, further inward axial movment of the plunger 90 being prevented by engagement of the annular shoulder 93 with the outer surface of the flange 74.

When it is desired to release the loudspeaker enclosure 10, the latch assembly 60 may be moved from its latching configuration illustrated in FIG. 5 back to its release configuration illustrated in FIG. 6 by grasping the plunger handle 92 and pulling the plunger 90 back out with a moderate force, which force will also serve to pull the swivel arm 25 back away from the swivel member 42 so that the teeth 30 and 50 disengage, outward movement of the plunger 90 being limited by engagement of the surfaces 98 and 78a. Thus, it will be appreciated that both latching and unlatching of the latch assembly 60 may be accomplished with one hand, the latching being accomplished by simply pushing the plunger 90 in, this movement also carrying the swivel arm 25 inwardly to engage the teeth 30 and 50, unlatching being accomplished by simply pulling the plunger 90 back out again.

It will be noted that the latch assembly 60 cannot be moved to the latching configuration illustrated in FIG. 5 by the use of moderate force unless the detent teeth 30 and 50 are engaged. Referring to FIG. 6, it can be seen that the outer diameter of the unexpanded fingers 75 is substantially the same as the diameter of the cylindrical surface 47 defining the small diameter region of the bore 44 in the swivel member 40, the surface 47 thus preventing any expansion of the expansible fingers 75. When the parts are in the release configuration illustrated in FIG. 6, with the teeth 30 and 50 disengaged, the expansible fingers 75 do not extend a sufficient distance past the annular shoulder 46 to permit the fingers 75 to be expanded by manual operation of the plunger 90 with moderate force. It is only when the swivel arm 25 and swivel member 40 are moved axially together to engage the teeth 30 and 50 that the expansible fingers 75 extend sufficiently past the annular shoulder 46 to permit sufficient leverage to be exerted by the plunger 90 on the expansible fingers 75 to effect expansion thereof to the expanded condition illustrated in FIG. 5.

The mounting bracket 20, the swivel member 40 and the latch assembly 60 may be constructed of any suitable material, but they are preferably formed of materials, such as plastics, nylon and the like, which lend themselves to fabrication of the parts by molding.

From the foregoing, it can be seen that there has been provided a novel swivel mount for a loudspeaker assembly or other object which permits the loudspeaker assembly or other mounted object to be latched in position and unlatched by a simple push-pull one-hand manual operation.

More particularly, there has been provided a latchable swivel mount of simple and economical construction which includes two swivel members each provided with detent means and movable between a release position where the detent means are disengaged and a latching condition wherein the detent means are engaged to prevent rotational movement of the swivel members with respect to each other, and further including plunger-actuated expansion type fastener means for latching the detent means in their engaged condition.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A latchable swivel mount comprising first and second swivel members coupled for relative rotational movement about a predetermined common axis and for relative axial movement along said axis, first detent means carried by said first swivel member, second detent means carried by said second swivel member and adapted for engagement with said first detent means to prevent relative rotational movement of said first and second swivel members, said first and second swivel members being movable axially between a swivel configuration wherein said first and second detent means are disengaged to permit relative rotational movement of said first and second swivel members and a latching configuration wherein said first and second detent means are engaged to prevent relative rotational movement of said first and second swivel members, and latch mechanism operable between a latching condition for locking said first and second swivel members in the latching configuration thereof and a release condition permitting relative axial movement of said first and second swivel members between the swivel and latching configurations thereof, said latch mechanism being manually operable between the latching and release conditions thereof only when said first and second detent members are in the latching configuration thereof.

2. The latchable swivel mount set forth in claim 1, wherein each of said first and second detent means includes a plurality of teeth adapted for meshing engagement with the teeth of the other detent means.

3. The latchable swivel mount set forth in claim 1, wherein each of said first and second detent means includes a circular planar array of teeth arranged coaxially about said axis, said planar arrays of teeth being disposed in parallel facing relationship and adapted for meshing engagement with each other when said first and second swivel members are disposed in the latching configuration thereof.

4. The latchable swivel mount set forth in claim 1, wherein said latch mechanism includes means for manually effecting operation thereof between the latching and release conditions thereof.

5. A latchable swivel mount comprising a first swivel member, a shaft having a longitudinal axis and being carried by said first swivel member and extending therefrom, said shaft being movable only rotatably with respect to said first swivel member, a second swivel member supported by said shaft for rotational movement about said axis and axial movement along said axis, first detent means carried by said first swivel member, second detent means carried by said second swivel member and adapted for engagement with said first detent means to prevent relative rotational movement of said first and second swivel members about said axis, said first and second swivel members being movable with respect to each other axially of said shaft between a swivel configuration wherein said first and second detent means are disengaged to permit relative rotational movement of said first and second swivel members and a latching configuration wherein said first and second detent means are engaged to prevent relative rotational movement of said first and second swivel members, and latch mechanism operable between a latching condition for locking said first and second swivel members in the latching configuration thereof and a release condition permitting relative axial movement of said first and second swivel members between the swivel and latching configurations thereof, said second swivel member being movable axially and rotatably with respect to said shaft when said latch mechanism is in the release condition thereof, said second swivel member being immovable with respect to said shaft when said latch mechanism is in the latching configuration thereof.

6. A latchable swivel mount comprising a first swivel member, a shaft having a longitudinal axis and being carried by said first swivel member and extending therefrom, a second swivel member supported by said shaft for rotational movement about said axis and axial movement along said axis, first detent means carried by said first swivel member, second detent means carried by said second swivel member and adapted for engagement with said first detent means to prevent relative rotational movement of said first and second swivel members about said axis, said first and second swivel members being movable with respect to each other axially of said shaft between a swivel configuration wherein said first and second detent means are disengaged to permit relative rotational movement of said first and second swivel members and a latching configuration wherein said first and second detent means are engaged to prevent relative rotational movement of said first and second swivel members, and latch mechansim operable between a latching condition for locking said first and second swivel members in the latching configuration thereof and a release condition permitting relative axial movement of said first and second swivel members between the swivel and latching configurations thereof, said latch mechanism being manually operable between the latching and release conditions thereof only when said first and second detent members are in the latching configuration thereof.

7. The latchable swivel mount set forth in claim 6, wherein said first swivel member is adapted for attachment to an associated support surface.

8. The latchable swivel mount set forth in claim 6, wherein said shaft is cylindrical in shape and generally circular in transverse cross section.

9. The latchable swivel mount set forth in claim 5, wherein said first swivel member has an opening therein receiving said shaft therethrough for rotational movement with respect thereto.

10. A latchable swivel mount comprising a first swivel member, a shaft having a longitudinal axis and being carried by said first swivel member and extending therefrom, said shaft having an expansible portion having an expander aperture extending axially therethrough and movable between a normal unexpanded condition and an expanded condition, said expansible portion having shoulder means extending inwardly of said expander aperture toward said axis for constricting said expander aperture, a second swivel member having a receiving aperture therein and receiving coaxially thereinto said expansible portion of said shaft for movement relative thereto rotationally about said axis and axially along said axis when said expansible portion is in the unexpanded condition thereof, first detent means carried by said first swivel member, second detent means carried by said second swivel member and adapted for engagement with said first detent means to prevent relative rotational movement of said first and second swivel members about said axis, said first and second swivel members being movable with respect to each other axially of said shaft between a swivel configuration wherein said first and second detent means are disengaged to permit relative rotational movement of said first and second swivel members and a latching configuration wherein said first and second detent means are engaged to prevent relative rotational movement of said first and second swivel members, and an expander member slidably supported in the expander aperture of said shaft for movement axially thereof between a latching position and a release position when said first and second swivel members are disposed in the latching configuration thereof, said expander member in the latching position thereof engaging said shoulder means and forcing said expansible portion outwardly to the expanded condition thereof to interfere with said second swivel member effectively to prevent axial movement thereof with respect to said shaft thereby to lock said first and second swivel members in the latching configuration thereof, said expander member in the release position thereof allowing said expansible portion of said shaft to be in the normal unexpanded condition thereof for permitting relative axial movement of said first and second swivel members between the swivel and latching configurations thereof.

11. The latchable swivel mount set forth in claim 10 wherein said expansible portion comprises a plurality of separate elongated fingers extending generally axially of said shaft, the distal ends of said fingers being inturned toward said axis.

12. The latchable swivel mount set forth in claim 10, wherein said shaft and said receiving aperture are cylindrical in shape and generally circular in transverse cross section.

13. The latchable swivel mount set forth in claim 10, wherein said expander member includes means for manually effecting movement thereof between the latching and release positions thereof.

14. The latchable swivel mount set forth in claim 10, and further including two first abutment members on said shaft and two second abutment members on said expander member, said first and second abutment members cooperating to limit the axial travel of said expander member and to trap said expander member in said expander aperture.

15. A latchable swivel mount comprising a first swivel member, a shaft having a longitudinal axis and being carried by said first swivel member and extending therefrom, said shaft having an expansible portion having an expander aperture extending axially therethrough and movable between a normal unexpanded condition and an expanded condition, said expansible portion having shoulder means extending inwardly of said expander aperture toward said axis for constricting said expander aperture, a second swivel member having a receiving aperture therein and receiving coaxially thereinto said expansible portion of said shaft for movement relative thereto rotationally about said axis and axially along said axis when said expansible portion is in the unexpanded condition thereof, said second swivel member having an abutment extending into the receiving aperture and effecting partition thereof into a first region dimensioned to accommodate said expansible portion of said shaft only in the unexpanded condition thereof and a second region dimensioned to accommodate said expansible portion in both the expanded and unexpanded conditions thereof, first detent means carried by said first swivel member, second detent means carried by said second swivel member and adapted for engagement with said first detent means to prevent relative rotational movement of said first and second swivel members about said axis, said first and second swivel members being movable with respect to each other axially of said shaft between a swivel configuration wherein said first and second detent means are disengaged to permit relative rotational movement of said first and second swivel members and a latching configuration wherein said first and second detent means are engaged to prevent relative rotational movement of said first and second swivel members, said expansible portion of said shaft being disposed in the first region of said receiving aperture so as to be restrained from expansion to the expanded condition when said first and second swivel members are in the swivel configuration thereof, said expansible portion of said shaft extending a predetermined distance into the second region of said receiving aperture sufficient to permit expansion to the expanded condition when said first and second swivel members are in the latching configuration thereof, said expansible portion of said shaft in the expanded condition thereof engaging said abutment for cooperation therewith and with said first swivel member to prevent relative movement of said first and second swivel members axially of said shaft, an expander member slidably supported in the expander aperture of said shaft for movement axially thereof between a latching position and a release position when said first and second swivel members are disposed in the latching configuration thereof, said expander member in the latching position thereof engaging said shoulder means and forcing said expansible portion outwardly to the expanded condition thereof to interfere with said abutment effectively to prevent axial movement of said second swivel member relative to said shaft thereby to lock said first and second swivel members in the latching configuration thereof, said expander member in the release position thereof allowing said expansible portion of said shaft to be in the normal unexpanded condition thereof for permitting relative axial movement of said first and second swivel members between the swivel and latching configurations thereof.

16. The latchable swivel mount set forth in claim 15, wherein said shaft and said receiving aperture and said expander member are cylindrical in shape and generally circular in transverse cross section, each of said first and second detent means comprising a circular planar array of teeth, said first and second arrays of teeth being disposed in parallel facing relationship and adapted for meshing engagement with each other when said first and second swivel members are disposed in the latching configuration thereof.

17. A latchable swivel mount for rotatably supporting an associated object, said swivel mount comprising a support member including a base and two parallel swivel arms extending from said base and spaced apart a distance sufficient freely to accommodate the associated object therebetween, two swivel members adapted to be fixedly secured to opposite ends of the associated object for coupling respectively to said swivel arms for movement relative thereto rotationally about a predetermined common axis and axially along said axis, first detent means carried by each of said swivel arms, second detent means carried by at least one of said swivel members and adapted for engagement with the associated one of said first detent means to prevent rotational movement of said swivel members and the associated object relative to said swivel arms, said one swivel member being movable relative to its associated swivel arm axially between a swivel configuration wherein said first and second detent means are disengaged to permit relative rotational movement of said swivel arms and said swivel members and a latching configuration wherein said first and second detent means are engaged to prevent relative rotational movement of said swivel arms and said swivel members, and a latch mechanism carried by the one swivel arm associated with said one swivel member and operable between a latching condition for locking said one swivel arm and said one swivel member in the latching configuration thereof and a release condition permitting relative axial movement of said one swivel arm and said one swivel member between the swivel and latching configurations thereof, said latch mechanism being manually operable between the latching and release conditions thereof only when said one swivel arm and said one swivel member are in the latching configuration thereof.

18. The latchable swivel mount set forth in claim 17 wherein said support member in integrally constructed of a single piece of material, said base being adapted for attachment to an associated support surface.

19. The latchable swivel mount set forth in claim 17, wherein said second detent means are carried by both of said swivel members and said latch mechanism is carried by both of said swivel arms.

20. The latchable swivel mount set forth in claim 17, wherein said support member is adapted for supporting thereon an associated loudspeaker assembly.

21. The latchable swivel mount set forth in claim 17, wherein each of said swivel members includes a rectangular attachment portion adapted to be fixedly secured to the associated object, and a cylindrical portion extending in use from said attachment portion coaxially with said axis.

* * * * *